(12) United States Patent
Tsuji et al.

(10) Patent No.: US 8,856,839 B2
(45) Date of Patent: Oct. 7, 2014

(54) CONTENT TRANSMITTER, CONTENT RECEIVER, AND CONTENT DISTRIBUTION METHOD

(75) Inventors: Masashi Tsuji, Tokyo (JP); Akira Ichie, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 344 days.

(21) Appl. No.: 13/364,049

(22) Filed: Feb. 1, 2012

(65) Prior Publication Data
US 2012/0278848 A1 Nov. 1, 2012

(30) Foreign Application Priority Data

Apr. 26, 2011 (JP) ................................. 2011-098651

(51) Int. Cl.
H04N 7/18 (2006.01)
(52) U.S. Cl.
USPC .................................. 725/80; 725/74; 725/82
(58) Field of Classification Search
CPC ............ H04N 21/43615; H04N 7/106; H04N 7/17318; H04N 21/47202; H04N 7/18
USPC .................... 725/74, 80, 82, 86, 91, 100, 118
See application file for complete search history.

(56) References Cited

U.S. PATENT DOCUMENTS

| 7,523,214 | B2 | 4/2009 | Kikkawa et al. | |
|---|---|---|---|---|
| 2006/0242664 | A1 | 10/2006 | Kikkawa et al. | |
| 2007/0005667 | A1* | 1/2007 | Yoshizawa | 707/203 |
| 2007/0260678 | A1* | 11/2007 | Fukui et al. | 709/203 |
| 2010/0085965 | A1* | 4/2010 | Teraoka et al. | 370/389 |
| 2010/0268810 | A1 | 10/2010 | Sato | |

FOREIGN PATENT DOCUMENTS

| EP | 2246791 A1 | 11/2010 |
|---|---|---|
| JP | 2004312412 | 11/2004 |
| JP | 2007-053538 | 3/2007 |
| JP | 2008053975 | 3/2008 |
| JP | 2008118410 | 5/2008 |
| JP | 2009-059081 | 3/2009 |
| JP | 2009-169732 | 7/2009 |
| JP | 2010-252005 | 11/2010 |

OTHER PUBLICATIONS

Japanese Patent Application No. 2012-266692, Notice of Rejection, mailed Aug. 20, 2013, (with English Translation).—Divisional Application of Japanese Patent Application No. 2012-173137 which is a divisional of Japanese Patent Application No. 2011-098651.

* cited by examiner

*Primary Examiner* — Ngoc Vu
(74) *Attorney, Agent, or Firm* — Blakely, Sokoloff, Taylor & Zafman LLP

(57) ABSTRACT

According to one embodiment, a content transmitter includes: a notification module and a content distribution module. The notification module is configured to notify, in response to a request from a content receiver, the content receiver of device information, container information, and content information. The device information indicates whether on-air content is distributed. The container information indicates a container including the on-air content. The content information includes content acquisition information indicating a destination from which the on-air content is acquired at when the on-air content is to be distributed to the content receiver. The content distribution module is configured to distribute the on-air content to the content receiver in response to a request from the content receiver based on the notified content information.

11 Claims, 14 Drawing Sheets

CONTENT TRANSMITTER, CONTENT RECEIVER, AND CONTENT DISTRIBUTION METHOD

CROSS-REFERENCE TO RELATED APPLICATIONS

This application is based upon and claims the benefit of priority from Japanese Patent Application No. 2011-098651, filed Apr. 26, 2011, the entire contents of which are incorporated herein by reference.

FIELD

Embodiments described herein relate generally to a content transmitter, a content receiver, and a content distribution method.

BACKGROUND

Digital content (hereinafter, referred to as content) such as an on-air program has been utilized in common among electronic devices such as hard disk drive (HDD) recorders, television devices, and personal computers (PCs), by data communications performed among the devices in accordance with a digital living network alliance (DLNA) guideline. In accordance with the DLNA guideline, content such as an on-air program is received by a digital media server (DMS) such as the HDD recorder and the television device, and distributed to a digital media player (DMP) such as the television device and the PC, so that the on-air program can be viewed on the DMP.

When viewing the on-air program on the television device, for example, a user simply turns on the power source of the television device so as to start a program that user wants to view. When viewing a program being broadcasted on the DMP in accordance with the DLNA guideline, a user needs to select the DMS distributing the on-air program, and content distributed from the DMS, in addition to start up an application to view the content. Thus, it is cumbersome for the user to perform such a necessary procedure so as to start viewing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a content transmitter comprises: a notification module and a content distribution module. The notification module is configured to notify, in response to a request from a content receiver, the content receiver of device information, container information, and content information, the device information indicating whether on-air content is distributed, the container information indicating a container comprising the on-air content, the content information comprising content acquisition information indicating a destination from which the on-air content is acquired at when the on-air content is to be distributed to the content receiver. The content distribution module is configured to distribute the on-air content to the content receiver in response to a request due to the notified content information from the content receiver.

Embodiments of a content transmitter, a content receiver, and a content distribution method are described in detail below with reference to the accompanying drawings. In the following embodiments, devices compliant with a universal plug and play audio visual standard (UPnP (Registered Trademark) AV standard) and a digital living network alliance (DLNA) guide line are used. Applicable devices are not limited to those described in the embodiments. For example, the configuration of the embodiments described below may be applied to devices and systems compliant with standards that are equivalent to or compatible with the above-described standard and the guide line, and also applied to devices and systems compliant with other standards and guidelines.

Figure 1:
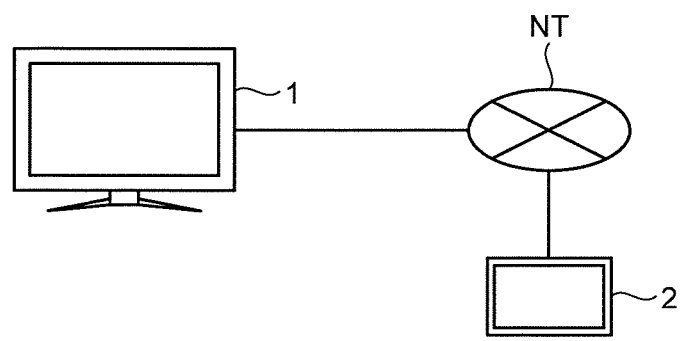
FIG. 1 is an exemplary conceptual diagram of a system configuration comprising a content transmitter and a content receiver according to an embodiment.

FIG. 1 is a conceptual diagram illustrating a system configuration comprising a content transmitter 1 and a content receiver 2 according to an embodiment. As illustrated in FIG. 1, the content transmitter 1 and the content receiver 2 are connected to each other through a communications network NT such as a local area network (LAN) such that they can communicate with each other. The content transmitter 1 is an electronic device called as a digital media server (DMS). The content transmitter 1 receives on-air content and distributes the on-air content, and also distributes content stored in a large capacity storage medium such as a hard disk drive (HDD) to, for example, the content receiver 2 that is compliant with the UPnP™ AV standard and the DLNA guideline, and connected to the content transmitter 1 through the communications network NT. The content transmitter 1, specifically, may be an HDD recorder, a television device, and a personal computer (PC). In the embodiment, the content transmitter 1 is a television device. The content receiver 2 is an electronic device called as a digital media player (DMP) or a digital media renderer (DMR). The content receiver 2 reproduces content distributed from the content transmitter 1 that is compliant with the UPnP™ AV standard and the DLNA guideline, and connected to the content receiver 2 through the communications network NT. The content receiver 2, specifically, may be a television device, and a PC. In the embodiment, the content receiver 2 is a portable display device. There may be a time lag in distribution and receiving of on-air content. For example, content temporarily stored in the HDD may be distributed or received.

Figure 2:
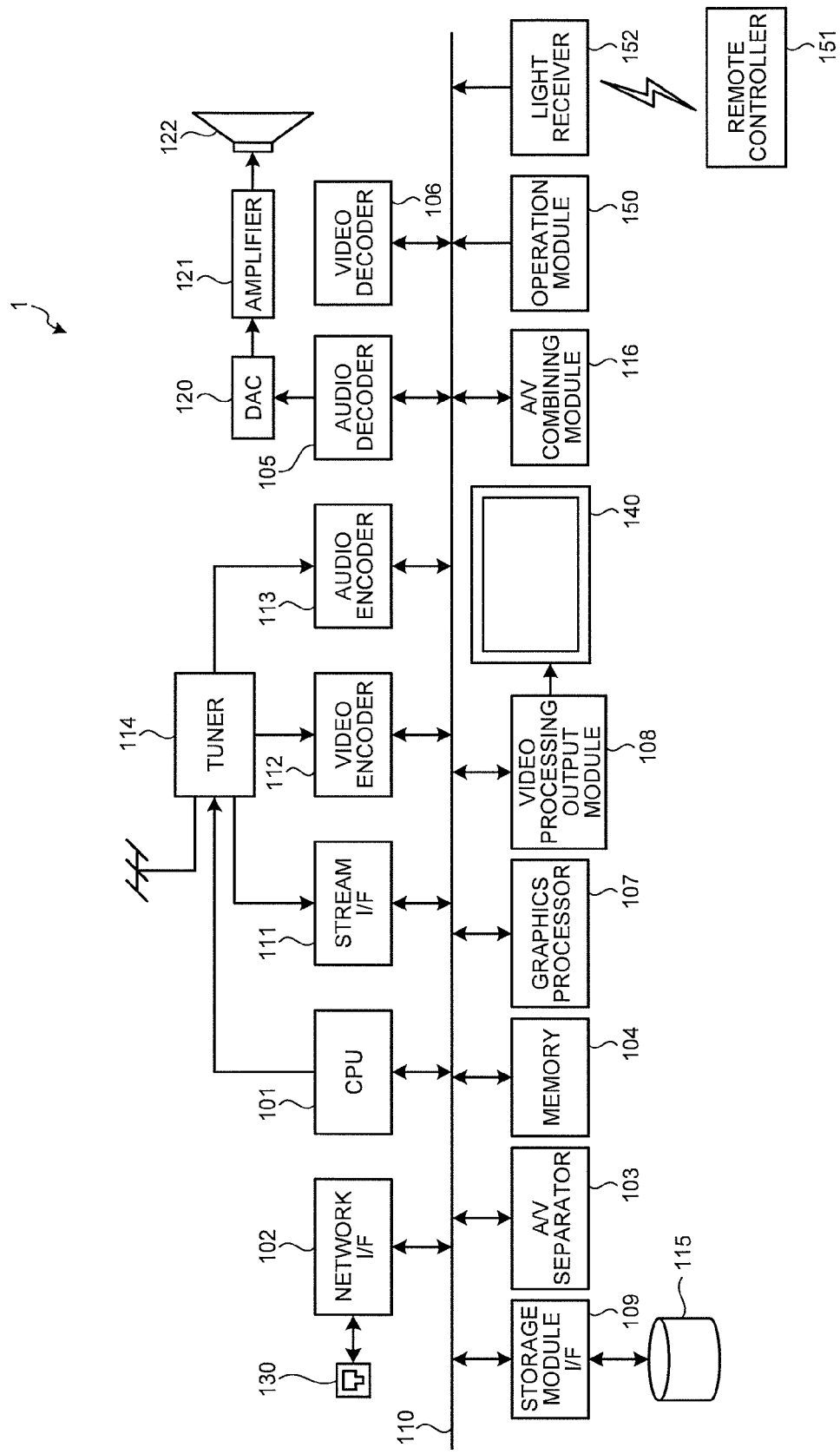
FIG. 2 is an exemplary block diagram of a hardware configuration of the content transmitter in the embodiment.

FIG. 2 is a block diagram illustrating a hardware configuration of the content transmitter 1 according to the embodiment. As illustrated in FIG. 2, the content transmitter 1 comprises a central processing unit (CPU) 101, a network interface (I/F) 102, an audio-video (A/V) separator 103, a memory 104, an audio decoder 105, a video decoder 106, a graphics processor 107, a video processing output module 108, a storage module interface (I/F) 109, a bus 110, a stream interface (I/F) 111, a video encoder 112, an audio encoder 113, a tuner 114, a hard disk drive (HDD) 115, an audio-video (A/V) combining module 116, a digital-to-analog (D/A) converter (DAC) 120, an amplifier 121, a speaker 122, a terminal 130, a display panel 140, an operation module 150, a remote controller 151, and a light receiver 152.

An analog video signal received by the tuner 114 is encoded by the video encoder 112. An analog audio signal received by the tuner 114 is encoded by the audio encoder 113. The encoded video signal and audio signal are combined by the A/V combining module 116 to form a stream. On the other hand, a digital video signal received by the tuner 114 is input to the stream I/F 111 as a stream of a moving picture experts group 2 (MPEG2)-transport stream (TS) format, for example. The stream is recorded in the HDD 115 through the storage module I/F 109. When the stream received by the tuner 114 is displayed without any change, the received stream is temporarily stored in the memory 104. Thereafter the video processing output module 108 displays the stream on the display panel 140. Such a stream received by the tuner 114 corresponds to, for example, content of an on-air program broadcasted by a broadcaster.

The terminal 130 is the Ethernet (registered trademark) terminal, for example, to couple with the communications network NT. The communications between the content transmitter 1 and the content receiver 2 connected to each other through the communications network NT are performed in accordance with the UPnP™ AV standard and the DLNA guideline under the control of the CPU 101 through the terminal 130 and the network I/F 102.

The stream recorded in the HDD 115, data of content that is received from another device with a content transmitting function through the terminal 130 and the network I/F 102, and content (stream) temporarily stored in the memory 104 after the receiving of the tuner 114, are separated into video data and audio data by the A/V separator 103 under the control of the CPU 101. The video data after separation is decoded by the video decoder 106. The decoded video data is output from the video processing output module 108 as a video signal, and displayed on the display panel 140. The audio data after separation of the A/V separator 103 is decoded by the audio decoder 105, processed by the DAC 120 and the amplifier 121, and output from the speaker 122.

The CPU 101 executes various programs stored in a storage medium such as a read only memory (ROM) not illustrated and the HDD 115 to entirely control the operation of the content transmitter 1. Specifically, the CPU 101 produces a graphical user interface (GUI) display screen, for example, in cooperation with the graphics processor 107, stores the GUI display screen in the memory 104 such as a random access memory (RAM), and reads and displays the screen on the display panel 140 if needed.

When receiving operation performed to the content transmitter 1 by using the remote controller 151, for example, through the operation module 150 or the light receiver 152, the CPU 101 switches among broadcast signals (channels) received by the tuner 114 in response to the operation, or detects input on the GUI display screen.

Figure 3:
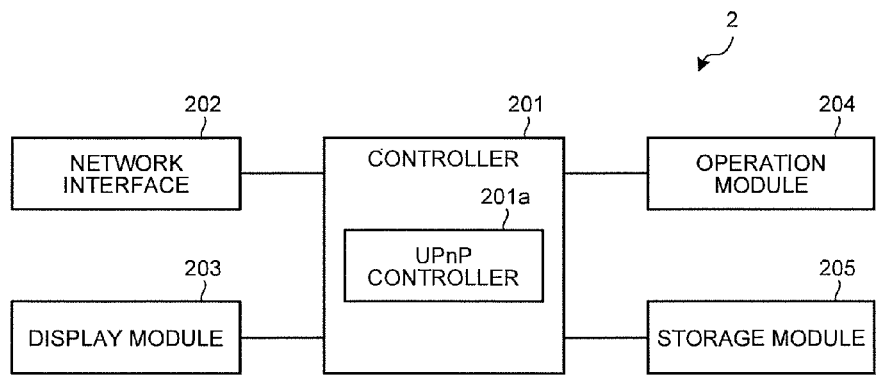
FIG. 3 is an exemplary block diagram of a hardware configuration of the content receiver in the embodiment.

FIG. 3 is a block diagram illustrating a hardware configuration of the content receiver 2 according to the embodiment. As illustrated in FIG. 3, the content receiver 2 comprises a controller 201, a network interface 202, a display module 203, an operation module 204, and a storage module 205.

The controller 201 comprises a micro controller, a CPU, a RAM, and a ROM, and centrally controls the operation of the content receiver 2. For example, the CPU loads various programs stored in the ROM to a working area of the RAM, sequentially executes the programs, and outputs control signals to each module inside the content receiver 2 so as to control operation of each module.

The controller 201 has a function of a UPnP controller 201a as a result of the execution of the programs. The UPnP controller 201a controls communications performed by the network interface 202 in accordance with the UPnP™ AV standard, and the DLNA guide line through the communications network NT. Specifically, the controller 201 controls communications relating to searching devices connected to the communications network NT, acquiring device information from the searched device, and desired action on the searched device. The device information acquired from each device is stored in a memory such as the RAM in the storage module 205 and managed, under the control of the UPnP controller 201a. Specifically, the device information searched for each device is stored in a device management table secured in the memory, and managed. The functions provided by the UPnP controller 201a are described later in detail.

The network interface 202 serving as a communications module is an interface for communications through the communications network NT under the control of the controller 201. Specifically, the network interface 202 communicates with a device connected to the content receiver 2 through the communications network NT, such as the content transmitter 1, in accordance with the UPnP™ AV standard, and the DLNA guide line.

The display module 203 is a liquid crystal display (LCD), for example, and displays content received from the content transmitter 1 through the communications network NT, an operation screen, an error display screen, and the like under the control of the controller 201. Audio output may be performed through a speaker (not illustrated) controlled by the controller 201.

The operation module 204 may be operation keys or a touch panel for receiving operation instructions from a user. The received operation instructions are notified to the controller 201. The storage module 205 may be the RAM or a rewritable non-volatile memory.

Figure 4:
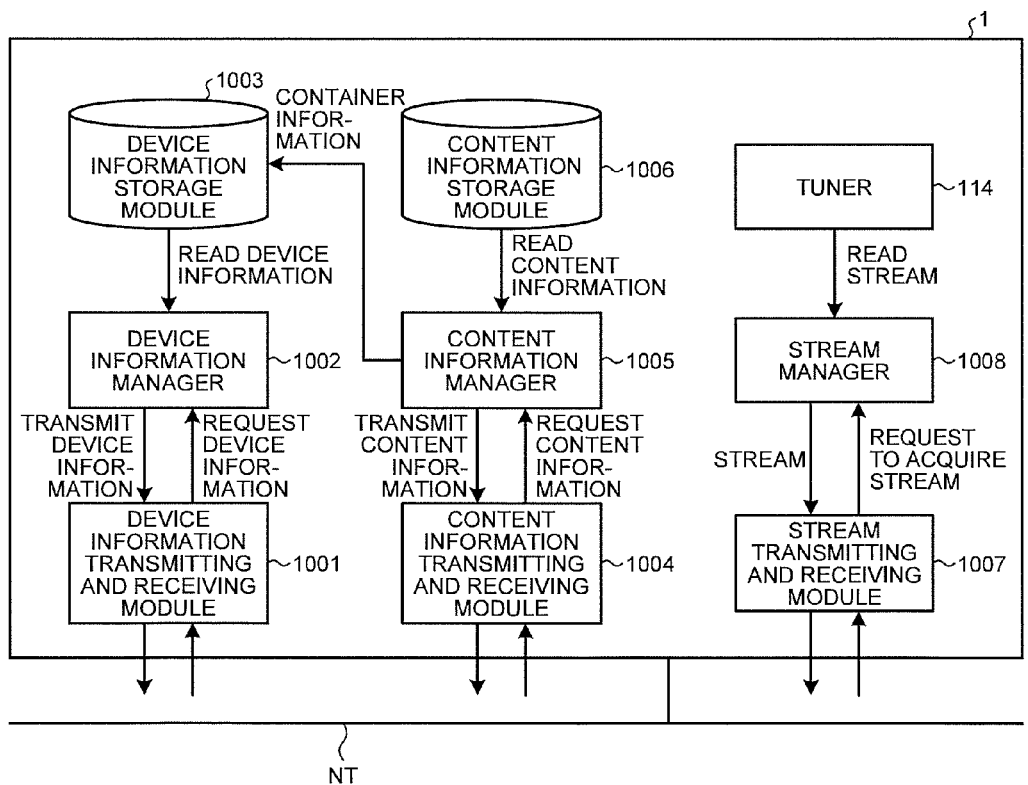
FIG. 4 is an exemplary block diagram of a functional configuration of the content transmitter in the embodiment.

FIG. 4 is a block diagram of a functional configuration of the content transmitter 1 according to the embodiment. As illustrated in FIG. 4, as a result of the execution of a program by the CPU 101, the content transmitter 1 realizes functions of a device information transmitting and receiving module 1001, a device information manager 1002, a device information storage module 1003, a content information transmitting and receiving module 1004, a content information manager 1005, a content information storage module 1006, a stream transmitting and receiving module 1007, and a stream manager 1008.

The device information transmitting and receiving module 1001 transmits and receives: device information of the content transmitter 1 and the content receiver 2; and container information indicating a storage location (container) of content of when the content transmitter 1 distributes the content, to/from the content receiver 2 connected to the content transmitter 1 through the communications network NT. The device information comprises identification information (information of whether real-time distribution is performed) such as a flag indicating whether the content transmitter 1 distributes content received from the tuner 114, i.e., on-air content, in real time. The container information comprises identification information (container ID) such as a uniform resource identifier (URI) indicating a folder (container) storing content (item). The container ID indicates the container storing on-air content of when the content transmitter 1 distributes the on-air content in real time. Hereinafter, distribution of on-air content performed in real time is called as real-time distribution. The device information transmitting and receiving module 1001 transmits and receives the device information and the container information based on a "Device Description" and a "Service Description" compliant with the UPnP™ AV standard and the DLNA guide line.

The device information manager 1002 manages the device information and the container information of the content transmitter 1. Specifically, when the device information transmitting and receiving module 1001 receives a request for the Device Description and the Service Description from, for example, the content receiver 2 connected to the content transmitter 1 through the communications network NT, the device information manager 1002 reads the device information and the container information preliminarily stored in the device information storage module 1003, and transmits the read device information and the container information to the content receiver 2 through the device information transmitting and receiving module 1001. The device information transmitting and receiving module 1001 and the device information manager 1002 are a notification module notifying the content receiver 2 of, in response to the request from the content receiver 2: the device information indicating whether the device distributes the on-air content; and the container information of the container storing the on-air content for when the on-air content is to be distributed to the content receiver 2.

The device information storage module 1003 is secured in the memory 104 and the HDD 115 as a storage area, and preliminarily stores therein the device information and the container information. The container information stored in the device information storage module 1003 is updated as needed by the content information manager 1005 (details are described later) managing content information such as the on-air content.

The content information transmitting and receiving module 1004 transmits and receives content information indicating each pieces of content stored in the container, to/from the content receiver 2 connected to the content transmitter 1 through the communications network NT. Specifically, in response to a request (Browse( )) compliant with the UPnP™ AV standard and the DLNA guide line from the content receiver 2, the content information transmitting and receiving module 1004 replies back to the content receiver 2 the content information corresponding to the content whose acquisition destination is designated with the container ID.

The content information manager 1005 manages the content information of each pieces of content stored in the container. Specifically, the content information manager 1005 stores the content information in the content information storage module 1006 for each content ID uniquely allocated so as to identify content, and manages the content information. The content information comprises an electronic program guide (EPG) information, such as a name of program, a receiving date and time, and a content, received corresponding to on-air content, audio and video file formats, and a container storing content, i.e., a content URI (content acquisition information) indicating a destination from which the content is acquired. For example, when the on-air content is changed due to changing a receiving channel, the content information manager 1005 updates the container information stored in the content information storage module 1006 by the content URI indicating the container storing the changed content. The content information storage module 1006 is secured in the memory 104 and the HDD 115 as a storage area, and stores therein the content information under the management of the content information manager 1005. The content information transmitting and receiving module 1004 and the content information manager 1005 are the notification module notifying the content receiver 2 of, in response to the request from the content receiver 2, the content information comprising the content acquisition information indicating the destination from which the content is acquired at when the content is to be distributed to the content receiver 2.

The stream transmitting and receiving module 1007 transmits and receives content (stream) stored in the container to/from the content receiver 2 connected to the content transmitter 1 through the communications network NT. Specifically, the stream transmitting and receiving module 1007 replies back to the content receiver 2 with the stream corresponding to the content whose acquisition destination is designated with the container ID, in response to a request (HTTP GET) compliant with the UPnP™ AV standard and the DLNA guide line.

The stream manager 1008 reads a stream received by the tuner 114 and manages the stream. Specifically, the stream manager 1008 outputs, to the stream transmitting and receiving module 1007, a stream such as a stream received by the tuner 114 and combined by the A/V combining module 116, a stream output from the stream I/F 111 and recorded in the HDD 115, and a stream corresponding to content designated by the stream transmitting and receiving module 1007 with the content URI. The stream transmitting and receiving module 1007 and the stream manager 1008 are a content distribution module that distributes on-air content to the content receiver 2 in response to the request from the content receiver 2.

Figure 5:
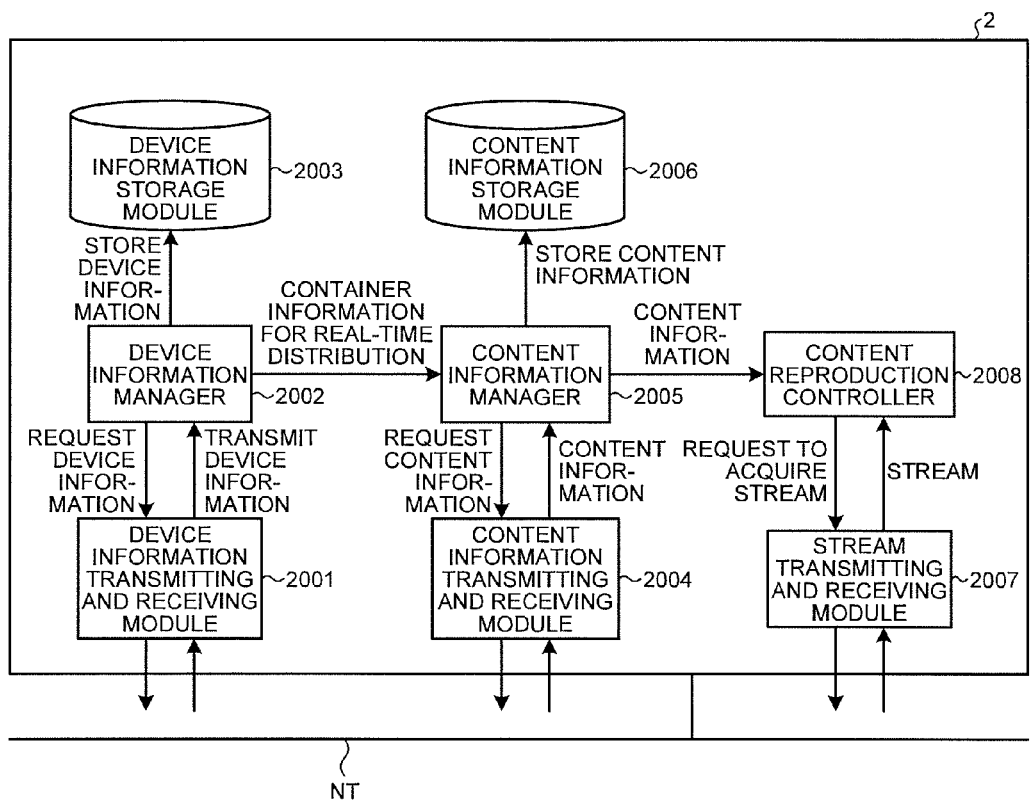
FIG. 5 is an exemplary block diagram of a functional configuration of the content receiver in the embodiment.

FIG. 5 is a block diagram illustrating a functional configuration of the content receiver 2 according to the embodiment. As illustrated in FIG. 5, in the UPnP controller 201a of the controller 201, the content receiver 2 realizes functions of a device information transmitting and receiving module 2001, a device information manager 2002, a device information storage module 2003, a content information transmitting and receiving module 2004, a content information manager 2005, a content information storage module 2006, a stream transmitting and receiving module 2007, and a content reproduction controller 2008.

As similar to the device information transmitting and receiving module 1001, the device information transmitting and receiving module 2001 transmits/receives: the device information of the content transmitter 1 and the content receiver 2; and the container information corresponding to the content distributed by the content transmitter 1, from/to the content transmitter 1 connected to the content receiver 2 through the communications network NT. The device information transmitting and receiving module 2001 transmits and receives the device information and the container information based on the Device Description and the Service Description compliant with the UPnP™ AV standard and the DLNA guide line.

The device information manager 2002 manages: the device information of the content receiver 2; and the device information and the container information acquired from the content transmitter 1 through the device information transmitting and receiving module 2001. Specifically, the device information manager 2002 causes the device information transmitting and receiving module 2001 to transmit an M-search request to devices connected to the content receiver 2 through the communications network NT, and receive responses from DMSs, for example. The device information manager 2002 then requests the Device Description and Service Description to the DMSs (in the embodiment, the content transmitter 1) that transmit the responses, and acquires the device information and the container information of the DMSs. The acquired device information and the container information are stored in the device information storage module 2003 secured in the storage module 205 as a storage area, and managed. The device information manager 2002 notifies the content information manager 2005 of one of pieces of container information (one of pieces of container information for real-time distribution) indicating the destination from which the content distributed in real-time is acquired, from among pieces of the acquired container information. Here, the device information manager 2002 may acquire, based on the device information of each of the DMSs, only the container information of a DMS performing the real-time distribution, and may notify the content information manager 2005 of that container information.

The content information transmitting and receiving module 2004 transmits/receives the content information indicating each piece of content stored in the container, to/from the content transmitter 1 connected to the content receiver 2 through the communications network NT. Specifically, the content information transmitting and receiving module 2004 transmits a request (Browse ( )) compliant with the UPnP™ AV standard and the DLNA guide line to the content transmitter 1, and receives the content information transmitted from the content transmitter 1 corresponding to the request.

The content information manager 2005 manages the content information of each piece of content stored in the container of the content transmitter 1. Specifically, the content information manager 2005 causes the content information transmitting and receiving module 2004 to request the content information of each piece of content stored in the container of the content transmitter 1. The content information comprises the content ID, the program name, the receiving date and time, the content, the audio and video file formats, and the content URI. The content information manager 2005 stores the content information transmitted from the content transmitter 1 in the content information storage module 2006 secured in the storage module 205 as a storage area, and manages the content information. The content information manager 2005 notifies the content reproduction controller 2008 of the content information relating to content distributed in real time based on the container information for real-time distribution notified from the device information manager 2002.

The stream transmitting and receiving module 2007 transmits/receives content (stream) stored in a container, to/from the content transmitter 1 connected to the content receiver 2 through the communications network NT. Specifically, the stream transmitting and receiving module 2007 transmits a request (HTTP GET) compliant with the UPnP™ AV standard and the DLNA guide line to the content transmitter 1, and receives the stream transmitted from the content transmitter 1 corresponding to the request.

The content reproduction controller 2008 controls reproduction of a stream received by the stream transmitting and receiving module 2007. Specifically, the content reproduction controller 2008 causes the stream transmitting and receiving module 2007 to request a stream relating to the content distributed in real time to the content transmitter 1, based on the content information corresponding to the content distributed in real time notified from the content information manager 2005. More specifically, the content reproduction controller 2008 causes the stream transmitting and receiving module 2007 to notify the content transmitter 1 of the content URI indicating the destination from which the content distributed in real time is acquired by using HTTP GET so as to request the stream. Then, the content reproduction controller 2008 reproduces the stream transmitted from the content transmitter 1 corresponding to the request as a display on the display module 203 or voice output from a speaker. In this way, content broadcasted by a broadcaster and received by the content transmitter 1 is reproduced.

Figure 6:
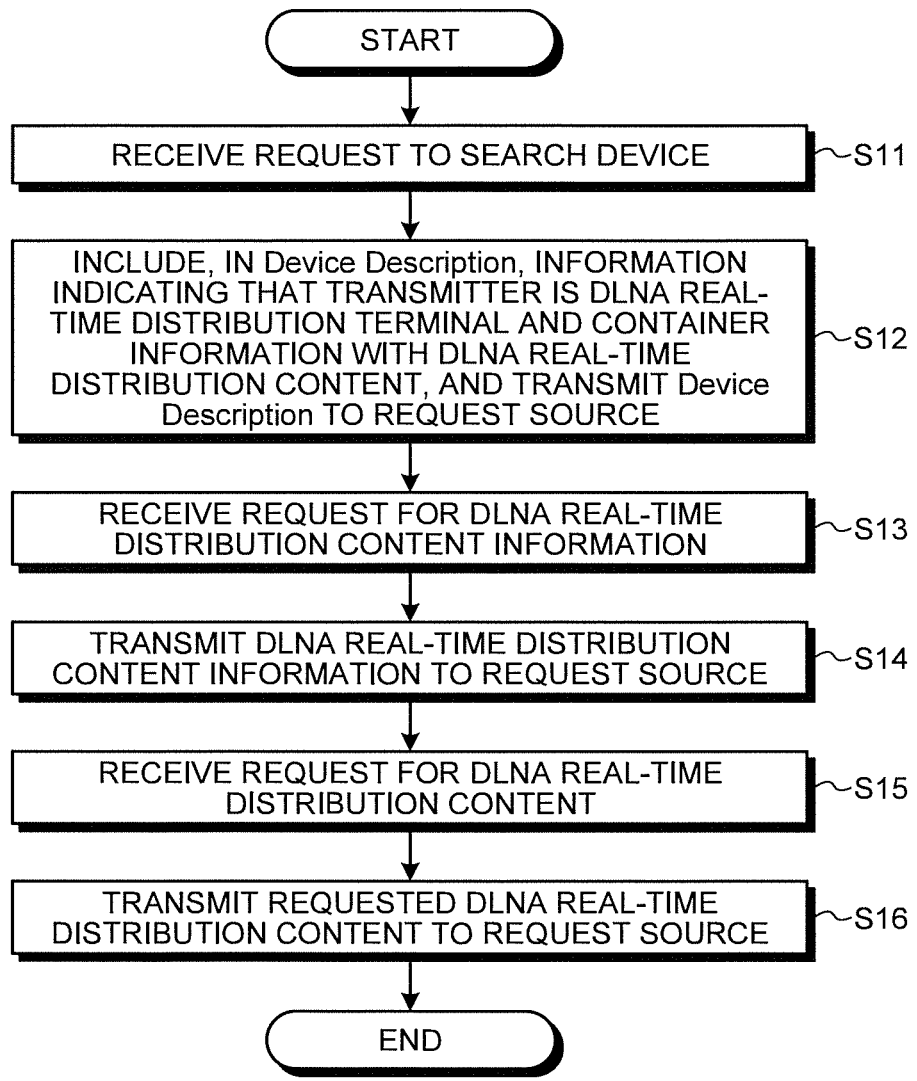
FIG. 6 is an exemplary flowchart operation of the content transmitter in the embodiment.

An operation flow of the content transmitter 1 according to the embodiment is described below. FIG. 6 is a flowchart illustrating an example of the operation of the content transmitter 1 according to the embodiment.

As illustrated in FIG. 6, the content transmitter 1 starts operation as a result of executing a program by the CPU 101, and the device information transmitting and receiving module 1001 receives a request to search a device, i.e., a request of the device description and the service description, after an M-Search request, from the content receiver 2 connected to the content transmitter 1 through the communications network NT (S11).

Then, the device information manager 1002 reads the identification information (information of whether real-time distribution is performed) and the container information from the device information storage module 1003. The identification information indicates that the content transmitter 1 is a DLNA real-time distribution terminal performing real-time distribution by communication compliant with the DLNA guide line. The container information comprises the container ID indicating the container storing DLNA real-time distribution content distributed in real time in accordance with the DLNA real-time distribution. The device information manager 1002 causes the device information transmitting and receiving module 1001 to transmit the Device Description comprising the identification information and the container information to the content receiver 2, which is a request source (S12).

Then, in the content transmitter 1, the content information transmitting and receiving module 1004 receives the request (Browse ( )) for the content information corresponding to the DLNA real-time distribution content from the content receiver 2 that receives the information that the content transmitter 1 is the DLNA real-time distribution terminal as the information of whether the real-time distribution is performed (S13). In response to the request, the content information manager 1005 reads the content information corresponding to the DLNA real-time distribution content from the content information storage module 1006, and causes the content information transmitting and receiving module 1004 to transmit the content information to the content receiver 2, which is the request source (S14).

Then, in the content transmitter 1, the stream transmitting and receiving module 1007 receives the request for the DLNA real-time distribution content (stream) whose content URI is designated by HTTP GET from the content receiver 2 which received the content information corresponding to the DLNA real-time distribution content (S15). In response to the request, the stream manager 1008 reads the DLNA real-time distribution content (stream) from the HDD 115 or the memory 104 based on the designated content URI, and causes the stream transmitting and receiving module 1007 to transmit the DLNA real-time distribution content (stream) to the content receiver 2 (S16).

Figure 7:
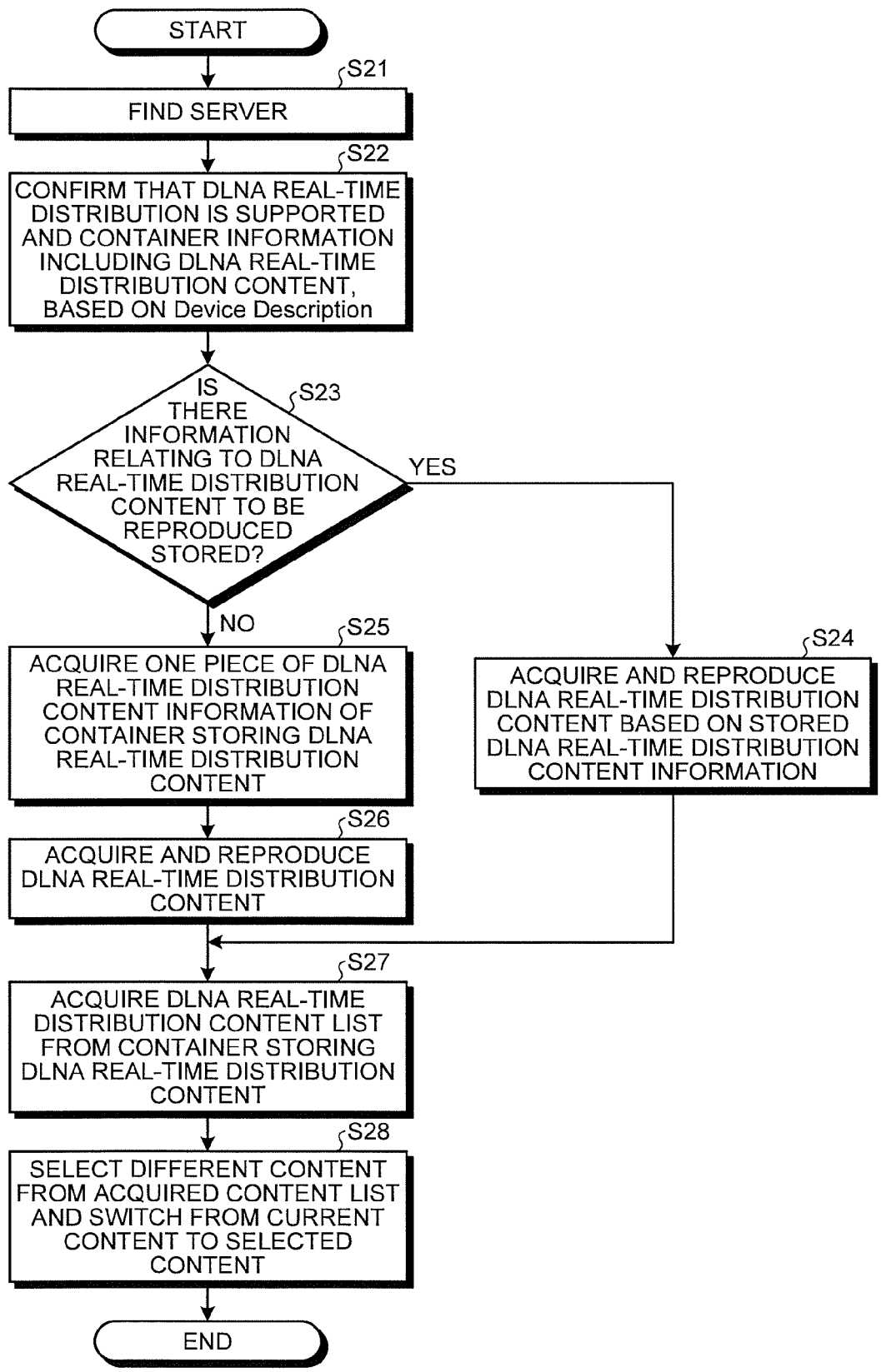
FIG. 7 is an exemplary flowchart of operation of the content receiver in the embodiment.

Operation of the content receiver 2 according to the embodiment is described below. FIG. 7 is a flowchart of an example of operation of the content receiver 2 according to the embodiment.

As illustrated in FIG. 7, a power source is turned on through the operation module 204, and the controller 201 executes a program providing the function of the DMP so that the content receiver 2 starts processing. Then, the device information manager 2002 transmits an M-search request from the device information transmitting and receiving module through the communications network NT, receives a response from a device connected to the communications network NT, and finds the content transmitter 1, which is the DMS (S21).

The device information manager 2002 requests the Device Description and Service Description to the content transmitter 1 that transmits the response, and acquires the device information and the container information of the content transmitter 1. The device information manager 2002 confirms that the content transmitter 1 supports the DLNA real-time distribution based on the information of whether the real-time distribution is performed, comprised in the device information acquired from the content transmitter 1. The device information manager 2002 confirms the container ID indicating the container storing the DLNA real-time distribution content based on the container information acquired from the content transmitter 1 (S22). The device information manager 2002 notifies the content information manager 2005 of the container information indicating the destination from which the content distributed in real time is acquired, i.e., the confirmed container ID.

Then, the content information manager 2005 confirms whether no content information corresponding to the container ID notified from the device information manager 2002, i.e., content information relating to the DLNA real-time distribution content to be reproduced, is stored in the content information storage module 2006 (S23). At S23, the content information manager 2005 confirms whether no content information relating to the DLNA real-time distribution content has been acquired in the previous processing and not stored in the content information storage module 2006.

If the content information relating to the DLNA real-time distribution content has been acquired and stored in the content information storage module 2006 (No at S23), the content information manager 2005 reads the content information relating to the DLNA real-time distribution content from the content information storage module 2006, and notifies the content reproduction controller 2008 of the read content information. The content reproduction controller 2008 causes the stream transmitting and receiving module 2007 to acquire the DLNA real-time distribution content from the content transmitter 1 based on the notified content information, more specifically, based on the content URI included in the content information, and reproduces the acquired DLNA real-time distribution content (S24).

If no content information relating to the DLNA real-time distribution content to be reproduced is stored in the content information storage module 2006 (Yes at S23), the content information manager 2005 causes the content information transmitting and receiving module 2004 to request (Browse ( )) the content information to the content transmitter 1 based on the container ID notified from the device information manager 2002, and acquires one piece of the content information relating to the DLNA real-time distribution content from the container storing the DLNA real-time distribution content (S25). There may be a plurality of pieces of content subjected to the DLNA real-time distribution due to the number of channels received by the tuner 114. Thus, at S25, the content information corresponding to one of the pieces of content is acquired from among the pieces of DLNA real-time distribution content. Content may be randomly selected so as to acquire the content information thereof.

At S25, the content information manager 2005 stores the acquired content information in the content information storage module 2006, and notifies the content reproduction controller 2008 of the acquired content information. Then, the content reproduction controller 2008 causes the stream transmitting and receiving module 2007 to acquire the DLNA real-time distribution content from the content transmitter 1 based on the notified content information, more specifically, based on the content URI included in the content information, and reproduces the acquired DLNA real-time distribution content (S26). As described above, the acquired content information is stored in the content information storage module 2006. This processing enables the DLNA real-time distribution content to be reproduced based on the content information stored in the content information storage module 2006 when the content receiver 2 starts processing next time.

Then, the content information manager 2005 acquires a list of the DLNA real-time distribution content in the container in which the DLNA real-time distribution content being currently reproduced is stored, i.e., remaining DLNA real-time distribution content stored in the container from which the DLNA real-time distribution content currently being reproduced has been acquired, based on the container ID notified from the device information manager 2002 (S27). The acquisition of the list of the DLNA real-time distribution content needs to acquire no content information when a channel is changed, i.e., the DLNA real-time distribution content is changed. As a result, channel switching can be performed at high speed.

Then, in response to channel switching operation though the operation module 204, the content reproduction controller 2008 switches content reproduction from the DLNA real-time distribution content currently being reproduced to content different from the DLNA real-time distribution content currently being reproduced (S28) from among the list of content acquired at S27. Specifically, the content reproduction controller 2008 causes the stream transmitting and receiving module 2007 to acquire the DLNA real-time distribution content from the content transmitter 1 based on the content URI comprised in the content information of the DLNA real-time distribution content selected from the list of content in response to the channel switching operation, and reproduces the acquired DLNA real-time distribution content.

As described above, in response to a request from the content receiver 2, the content transmitter 1 notifies the content receiver 2 of: the device information indicating whether on-air content is to be distributed; the container information indicating the destination from which of the on-air content is acquired at when the on-air content is distributed to the content receiver 2; and the content information. The content transmitter 1 distributes the on-air content to the content receiver 2 in response to the request from the content receiver 2 based on the notified container information and content information. The content receiver 2 acquires the device information, the container information, and the content information from the content transmitter 1, and receives the on-air content from the destination indicated by the content information in the content transmitter 1 indicated by the acquired device information as the device distributing the on-air content, and reproduces the on-air content. In this way, the content receiver 2 acquires the on-air content from the content transmitter 1 that distributes the on-air content, based on the device information, the container information, and the content information from the content transmitter 1. Accordingly, the content receiver 2 does not need to select the DMS distributing the on-air content, and to select content distributed from the DMS. As a result, it is easy for a user to view content without performing a cumbersome procedure.

A first modification of the above-described embodiment is described below. The first modification enables a user to easily view, by a content receiver, content displayed on a display panel or the like of a content transmitter when the content transmitter displays on-air content on the display panel thereof.

Figure 8:
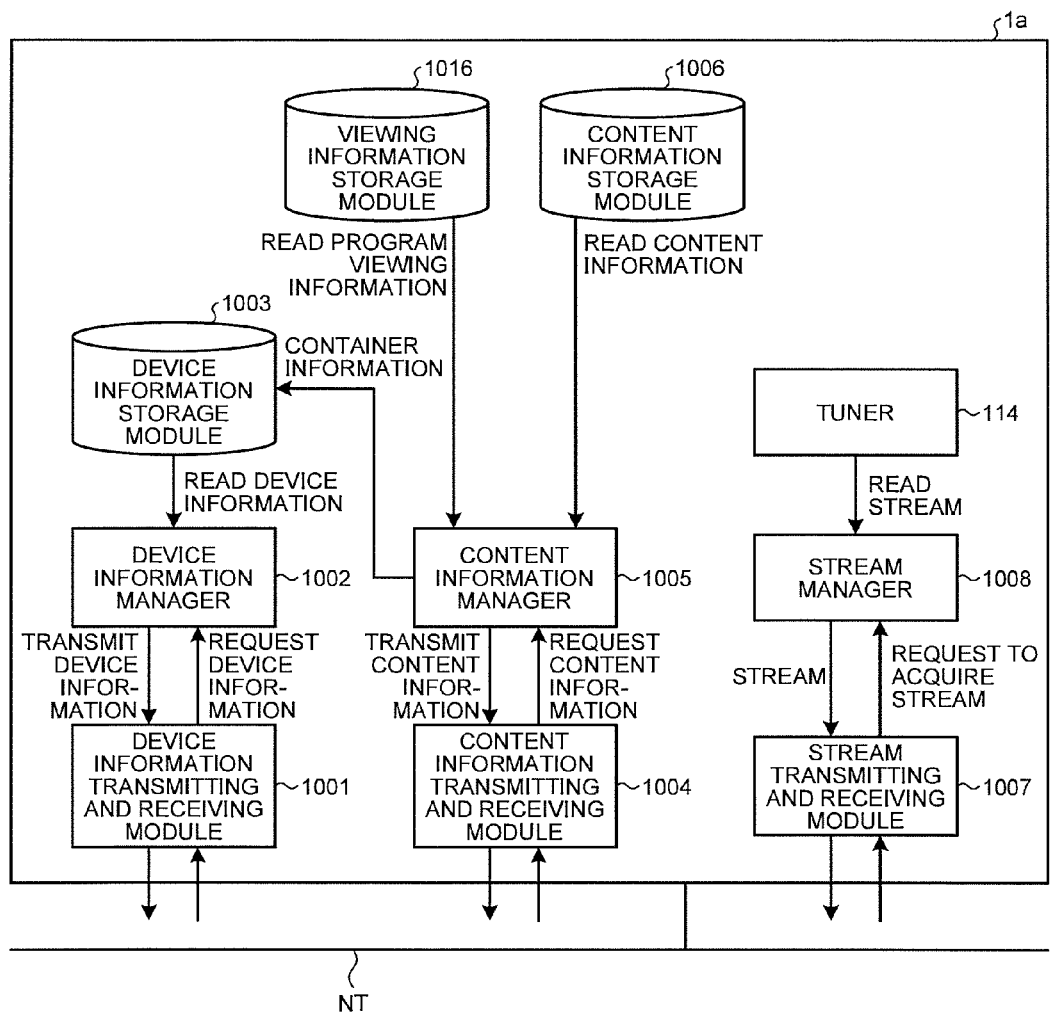
FIG. 8 is an exemplary block diagram of a functional configuration of a content transmitter according to a first modification of the embodiment.

FIG. 8 is a block diagram of a functional configuration of a content transmitter 1a according to the first modification. As illustrated in FIG. 8, the content transmitter 1a comprises a viewing information storage module 1016 that stores therein program viewing information indicating on-air content currently displayed on the display panel 140. The viewing information storage module 1016 is secured in the memory 104 and the HDD 115 as a storage area, and stores therein the content information indicating content currently displayed on the display panel 140 as program viewing information under the management of the content information manager 1005.

Figure 9:
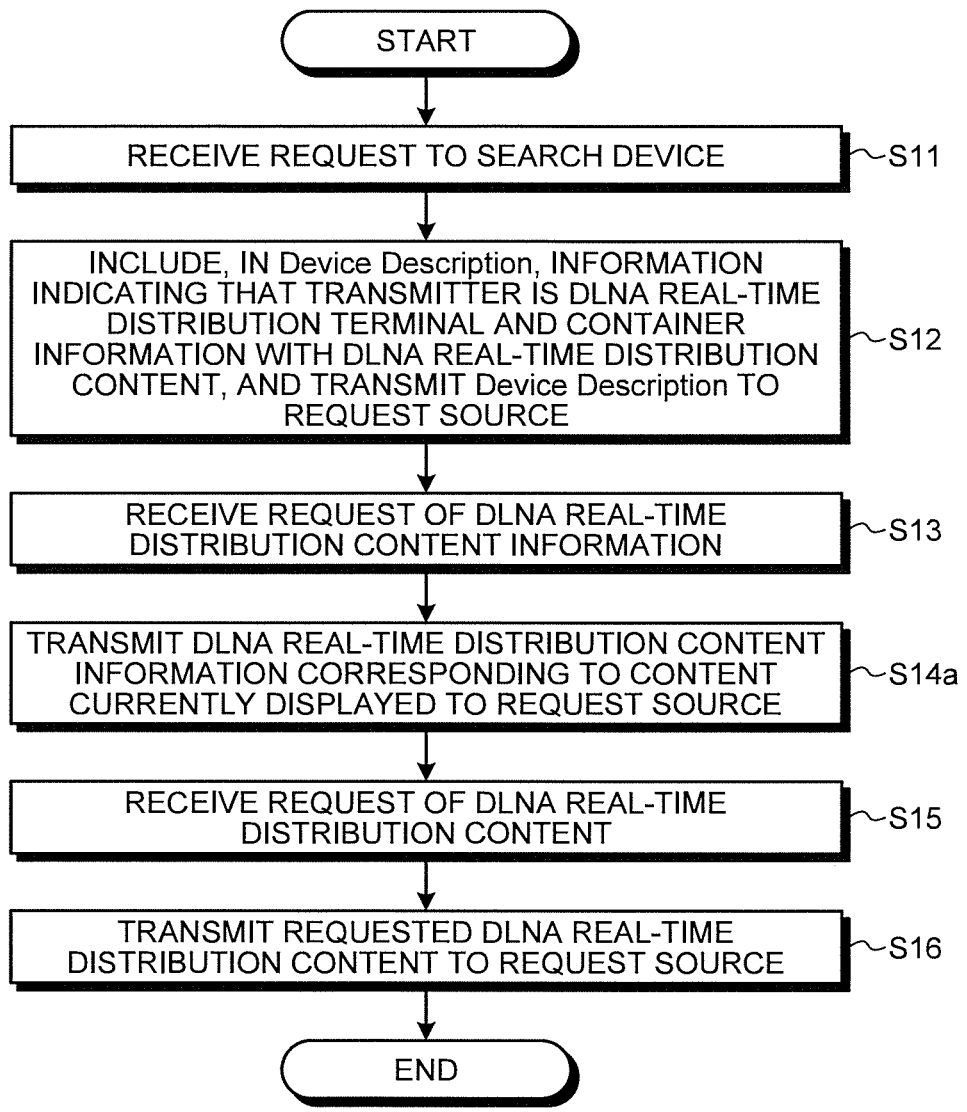
FIG. 9 is an exemplary flowchart of operation of the content transmitter in the first modification.

FIG. 9 is a flowchart illustrating an example of the operation of the content transmitter 1a according to the first modification. As illustrated in FIG. 9, in the first modification, in response to the request for the content information of the DLNA real-time distribution content from the content receiver 2 (S13), the content information manager 1005 causes the content information transmitting and receiving module 1004 to transmit the content information of one of pieces of the DLNA real-time distribution content corresponding to content currently displayed on the display panel 140, to the content receiver 2 (the request source) (S14a). Specifically, the content information manager 1005 reads the program viewing information from the viewing information storage module 1016, and transmits the program viewing information to the content receiver 2 (the request source).

Figure 10:
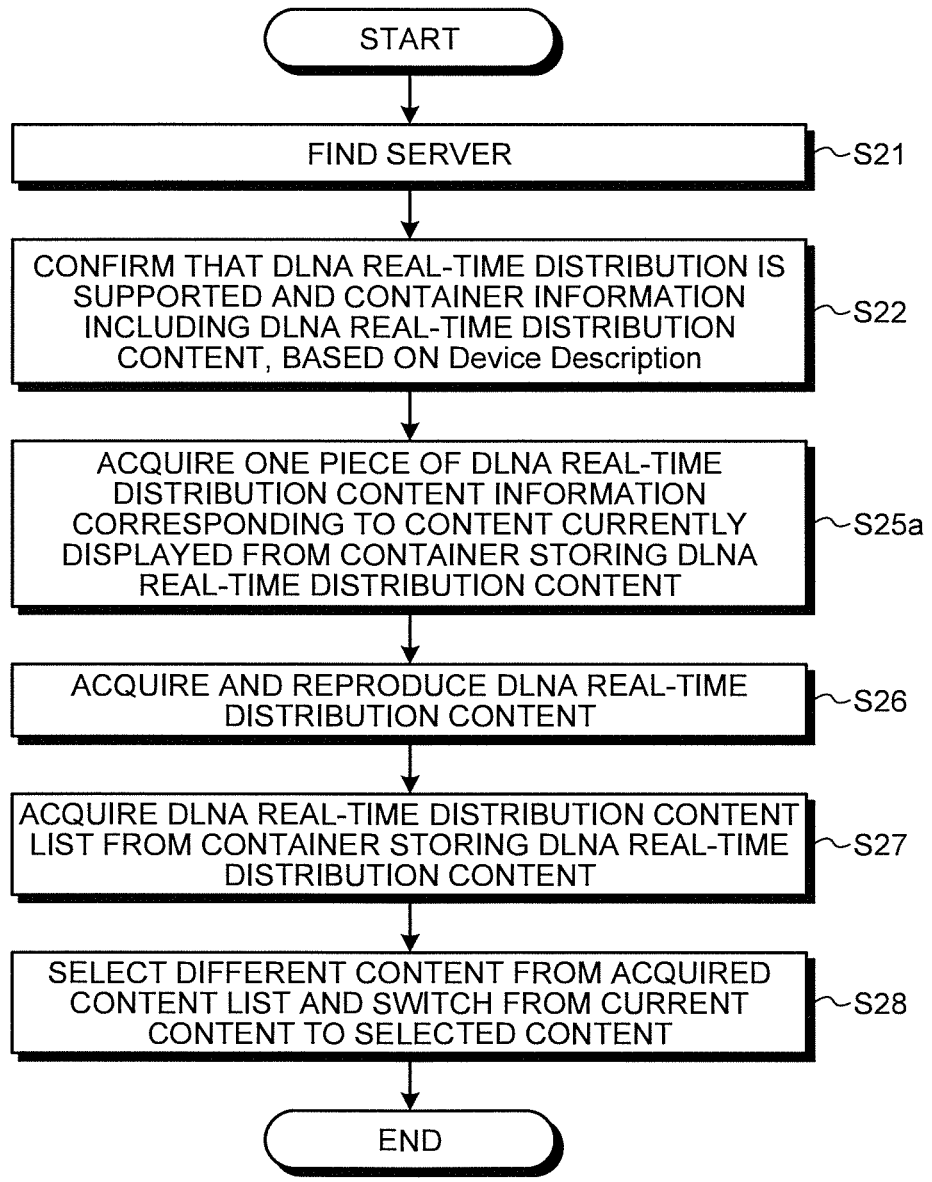
FIG. 10 is an exemplary flowchart of operation of a content receiver in the first modification.

FIG. 10 is a flowchart illustrating an example of the operation of the content receiver 2 according to the first modification. As illustrated in FIG. 10, in the first modification, the content information manager 2005 causes the content information transmitting and receiving module 2004 to request (Browse ( ) or expanded action, which is described later in detail) the content information to the content transmitter 1 based on the container ID notified from the device information manager 2002, and acquires one piece of the content information of the DLNA real-time distribution content corresponding to the program viewing information transmitted in response to the request, i.e., the content currently displayed on the display panel 140 (S25a). Then, the content reproduction controller 2008 causes the stream transmitting and receiving module 2007 to acquire the DLNA real-time distribution content from the content transmitter 1 based on the notified content information, more specifically, based on the content URI included in the content information, and reproduces the acquired DLNA real-time distribution content, i.e., the content currently displayed on the display panel 140 (S26).

In this way, the content receiver 2 according to the first modification enables content to be viewed without selection of the content currently displayed on the display panel 140 of the content transmitter 1a. As a result, a user does not need to perform cumbersome operation such as content selection operation when content currently displayed by a DMS installed in a living room of the user's home is to be viewed on a DMP in another room.

A second modification of the above-described embodiment is described below. In the second modification, the operation of the content transmitter 1 and the content receiver 2 according to the above-described embodiment is defined as an expanded action by using a descriptor reserving expanded use in the UPnP™ AV standard and the DLNA guide line. Examples of the operation defined as the expanded action comprise: operation to confirm whether the content transmitter 1 performs the DLNA real-time distribution; acquiring a list of content reproduced by the content receiver 2 at the first starting-up (first time) and of the DLNA real-time distribution content stored in a container the same as that storing the DLNA real-time distribution content in the content transmitter 1; and inquiring or acquiring the content currently displayed as described in the first modification.

Figure 11:
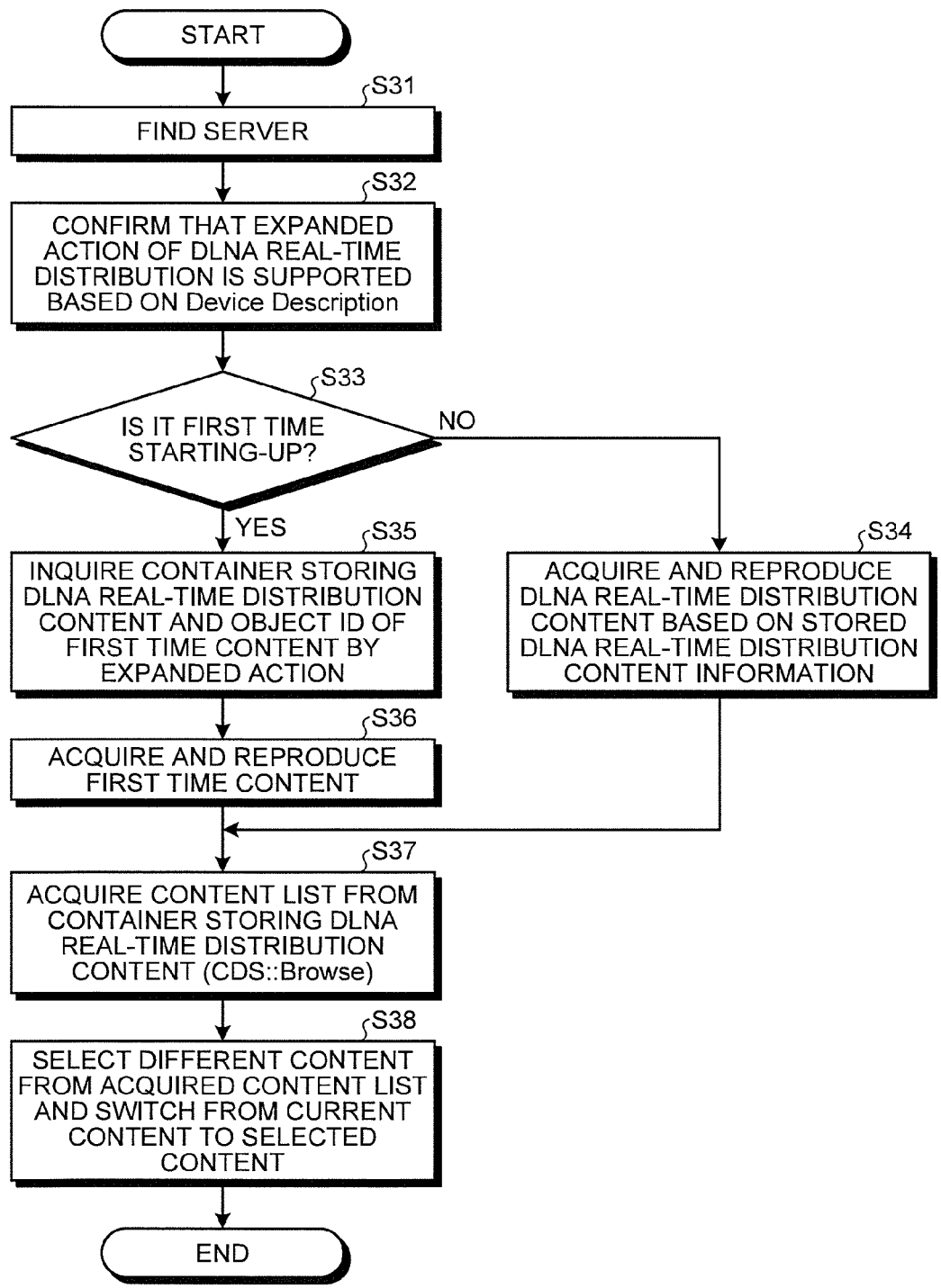
FIG. 11 is an exemplary flowchart of operation of a content receiver according to a second modification of the embodiment.

FIG. 11 is a flowchart illustrating an example of the operation of the content receiver 2 according to the second modification. As illustrated in FIG. 11, the content receiver 2 starts processing in the same manner as S21. Then, the device information manager 2002 transmits an M-search request over the communications network NT, receives a response from a device connected to the communications network NT, and finds the content transmitter 1, which is the DMS (S31).

Then, the device information manager 2002 confirms, with respect to the responded content transmitter 1, whether the DLNA real-time distribution is performed is supported as the predefined expanded action in the content transmitter 1 that transmits a response, based on the Device Description (S32). After the confirmation by the expanded action, the following processing relating to acquisition of the DLNA real-time distribution content is performed to the content transmitter 1 in which the DLNA real-time distribution is supported.

Specifically, the content information manager 2005 confirms presence or absence of the content information stored in the content information storage module 2006 so as to determine whether the starting-up of the content receiver 2 is the first time (S33). If it is determined that the starting-up is not the first time (No at S33), the content reproduction controller 2008, in the same manner as S24, acquires the DLNA real-time distribution content from the content transmitter 1 based on the content information of the DLNA real-time distribution content already stored in the content information storage module 2006, and reproduces the acquired DLNA real-time distribution content (S34).

If it is determined that the starting-up is the first time (Yes at S33), the content information manager 2005 inquires the content ID indicating the DLNA real-time distribution content that the content receiver 2 reproduces the first time, and the container ID indicating the container storing the DLNA real-time distribution content to the content transmitter 1 by predefined expanded action (S35). As described in the first modification, the content information of the DLNA real-time distribution content corresponding to the program viewing information, i.e., the content currently displayed on the display panel 140, may be inquired by the expanded action. The content URI acquired from the content transmitter 1 as the response of the inquiry at S35 is notified to the content reproduction controller 2008. Then, the content reproduction controller 2008, based on the notified content URI, causes the stream transmitting and receiving module 2007 to acquire the DLNA real-time distribution content to be reproduced the first time from the content transmitter 1, and reproduces the acquired DLNA real-time distribution content (S36).

Then, the content information manager 2005 acquires a list of the remaining DLNA real-time distribution content in the container storing the DLNA real-time distribution content by using predefined expanded action (S37). Then, in the same manner as S28, the content reproduction controller 2008, in response to channel switching operation though the operation module 204, switches content reproduction from the DLNA real-time distribution content currently being reproduced to content, out of the list of content acquired at S37, different from the DLNA real-time distribution content currently being reproduced (S38).

As described in the second modification, the expanded action defined by the descriptor reserving extensional use in the UPnP™ AV standard, and the DLNA guide line may be utilized.

A third modification of the above-described embodiment is described below. In the third modification, distribution of on-air content is restricted by scheduled operation preliminarily set in the content transmitter. The scheduled operation means the operation to be performed by the device now or in the future. The scheduled operation in the content transmitter such as the DMS includes, for example: receiving of a predetermined channel at a predetermined time period based on viewing on timer, recording on timer, distribution of stream on timer, reception of stream on timer, or the like; and displaying or recording of the received content, distributing of the stream, receiving of the stream, or the like.

Figure 12:
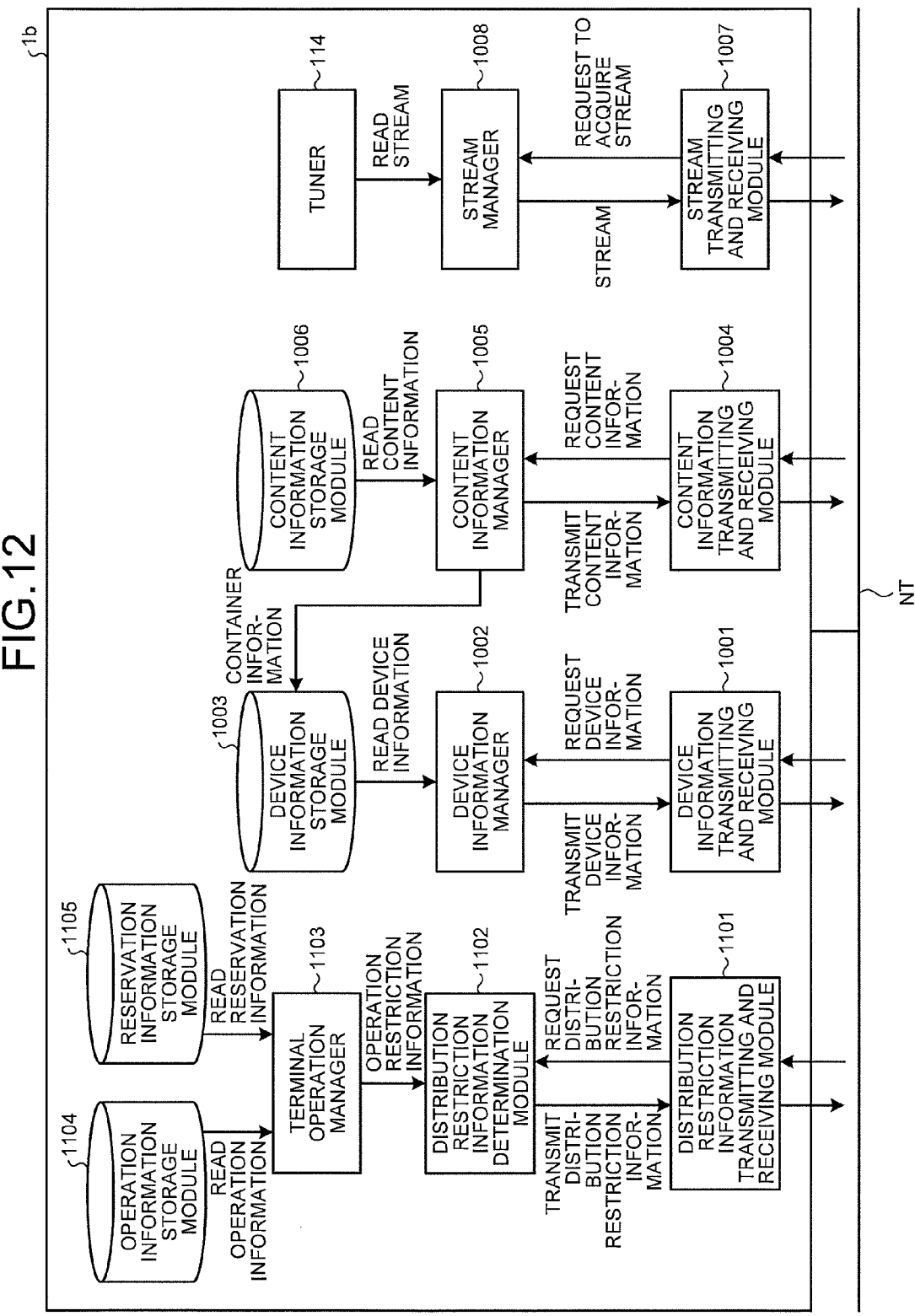
FIG. 12 is an exemplary block diagram of a functional configuration of a content transmitter according to a third modification of the embodiment.

FIG. 12 is a block diagram illustrating a functional configuration of a content transmitter 1b according to the third modification. As illustrated in FIG. 12, the content transmitter 1b comprises a distribution restriction information transmitting and receiving module 1101, a distribution restriction information determination module 1102, a terminal operation manager 1103, an operation information storage module 1104, and a reservation information storage module 1105, in addition to the functional configuration of the content transmitter 1.

The distribution restriction information transmitting and receiving module 1101 transmits/receives distribution restriction information indicating that distribution of content is restricted due to the scheduled operation, to/from the content receiver 2 connected to the content transmitter 1b through the communications network NT. Specifically, the distribution restriction information transmitting and receiving module 1101 transmits/receives the distribution restriction information to/from the content receiver 2 based on the Device Description and the Service Description compliant with the UPnP™ AV standard and the DLNA guide line.

In response to a request for the distribution restriction information from the content receiver 2 through the distribution restriction information transmitting and receiving module 1101, the distribution restriction information determination module 1102 determines the distribution restriction information based on operation restriction information notified from the terminal operation manager 1103, and transmits the determined distribution restriction information to the content receiver 2. The operation restriction information is information indicating restriction due to scheduled operation of the device now and in the future. For example, the operation restriction information is data in which predetermined operation schedule for a predetermined time period is described in time sequence. The distribution restriction information determination module 1102 determines the distribution restriction information so that, for example: the distribution of the content is restricted to distribution of content scheduled to be received during a predetermined time period; or the distribution of the content is not to be performed during the predetermined time period, when the content transmitter 1b performs operation in accordance with the schedule described in the operation restriction information. Specifically, when a viewing or recording of a predetermined channel on timer, a stream distribution on timer, and a receiving of stream on timer are described as a schedule for a predetermined time period now and in the future, the distribution of content is to be restricted to the content to be viewed or recorded, distributed as stream, or received as stream, during the scheduled time period. If it is described in the schedule that a power source is forcibly turned off at a predetermined time period, distribution of content is not to be performed at that time period.

The terminal operation manager 1103 manages operation performed by the content transmitter 1b now and in the future, i.e., manages the schedule of the content transmitter 1b. Specifically, the terminal operation manager 1103 watches the current operation conditions of the content transmitter 1b, and stores operation information indicating the operation conditions in the operation information storage module 1104. The terminal operation manager 1103 stores reservation information in the reservation information storage module 1105. The reservation information indicates the schedule of the content transmitter 1b, such as the timer viewing, the timer recording, the stream distribution on timer, the receiving of stream on timer, received by the operation module 150 or the remote controller 151 through user's operation. In response to the request for the distribution restriction information, the terminal operation manager 1103 reads the operation information stored in the operation information storage module 1104 and reads the reservation information stored in the reservation information storage module 1105, produces operation restriction information now and in the future, and notifies the distribution restriction information determination module 1102 of the operation restriction information.

Figure 13:
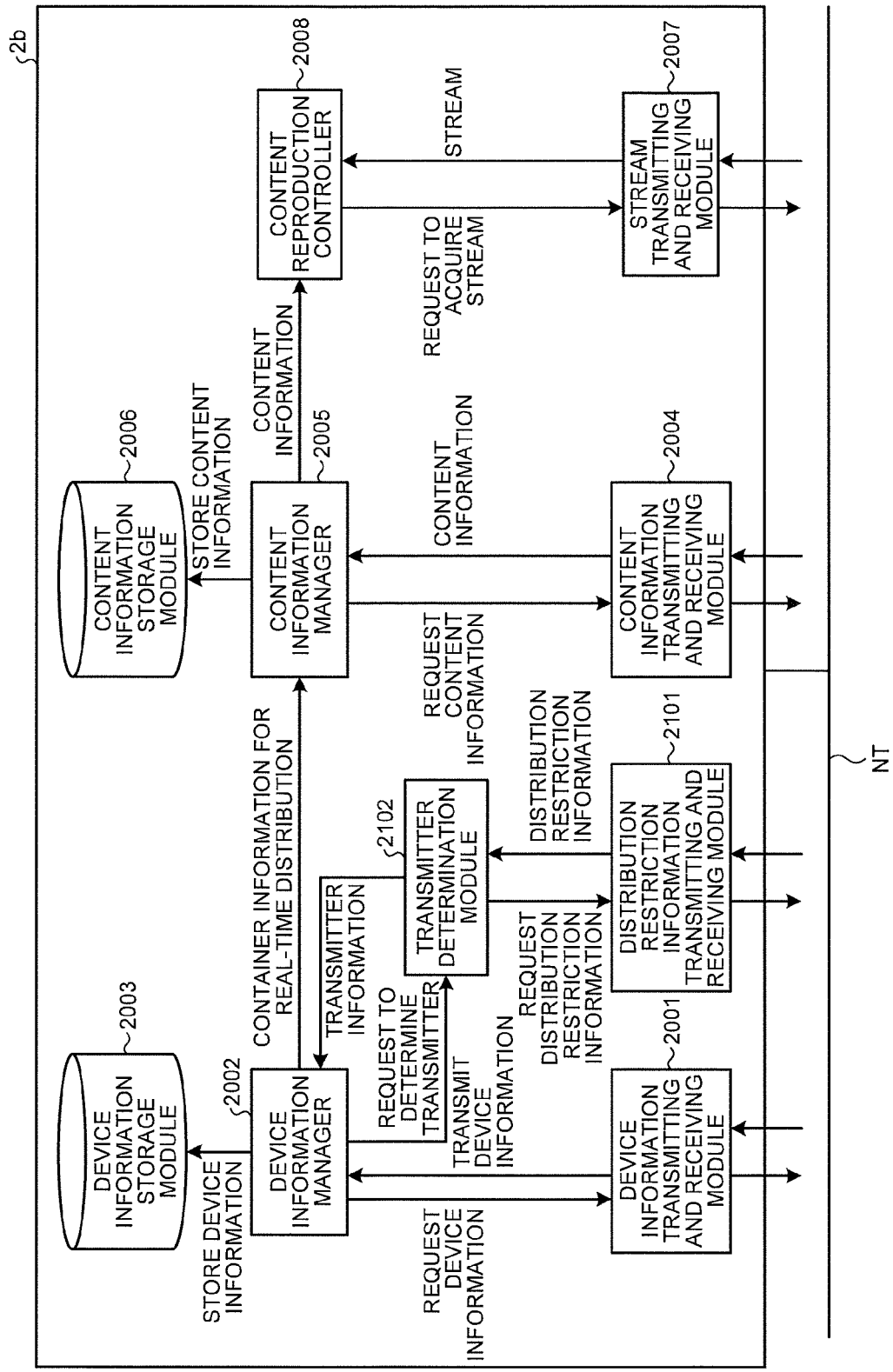
FIG. 13 is an exemplary block diagram of a functional configuration of a content receiver in the third modification.

FIG. 13 is a block diagram illustrating a functional configuration of a content receiver 2b according to the third modification. As illustrated in FIG. 13, the content receiver 2b comprises: a distribution restriction information transmitting and receiving module 2101; and a transmitter determination module 2102, in addition to the functional configuration of the content receiver 2.

The distribution restriction information transmitting and receiving module 2101 transmits/receives the distribution restriction information to/from the content transmitter 1b connected to the content receiver 2b through the communications network NT. Specifically, the distribution restriction information transmitting and receiving module 2101 transmits/receives the distribution restriction information to/from the content transmitter 1b based on the Device Description and the Service Description compliant with the UPnP™ AV standard and the DLNA guide line, and the expanded action.

When the device information manager 2002 finds a plurality of content transmitters 1b each of which distributes on-air content, the transmitter determination module 2102 determines one of the content transmitter 1b from which the content receiver 2b receives distributed on-air content, based on the distribution restriction information received by the distribution restriction information transmitting and receiving module 2101 from each content transmitter 1b. Specifically, when a plurality of content transmitters 1b each distributes on-air content are found, the transmitter determination module 2102 causes the distribution restriction information transmitting and receiving module 2101 to request the distribution restriction information to each found content transmitter 1b, in response to the request to determine a transmitter notified from the device information manager 2002. Thereafter, the transmitter determination module 2102 determines the content transmitter 1b that can distribute on-air content now and in the future based on the distribution restriction information acquired from each content transmitter 1b. Examples of the content transmitter 1b that can distribute content comprise: the content transmitter 1b that the distribution is not restricted to content scheduled to be received in a predetermined time period; the content transmitter 1b that distributes content full time, and the content transmitter 1b that has a viewing reservation, a recording reservation, a distribution reservation, or a receiving reservation of content in a time zone in which the content receiver 2b requests content distribution, now and in the future.

Then, the transmitter determination module 2102 notifies the device information manager 2002 of the device information indicating the determined content transmitter 1b. Based on the notification, the device information manager 2002 selects, out of the content transmitters 1b, the content transmitter 1b from which the content receiver 2b receives distributed on-air content. In this way, based on the decision of the transmitter determination module 2102, the content transmitter 1b from which the content receiver 2b receives distributed on-air content is selected. Accordingly, in the content receiver 2b, intermittence of on-air content reproduction can be prevented during reproduction of the on-air content.

Figure 14:
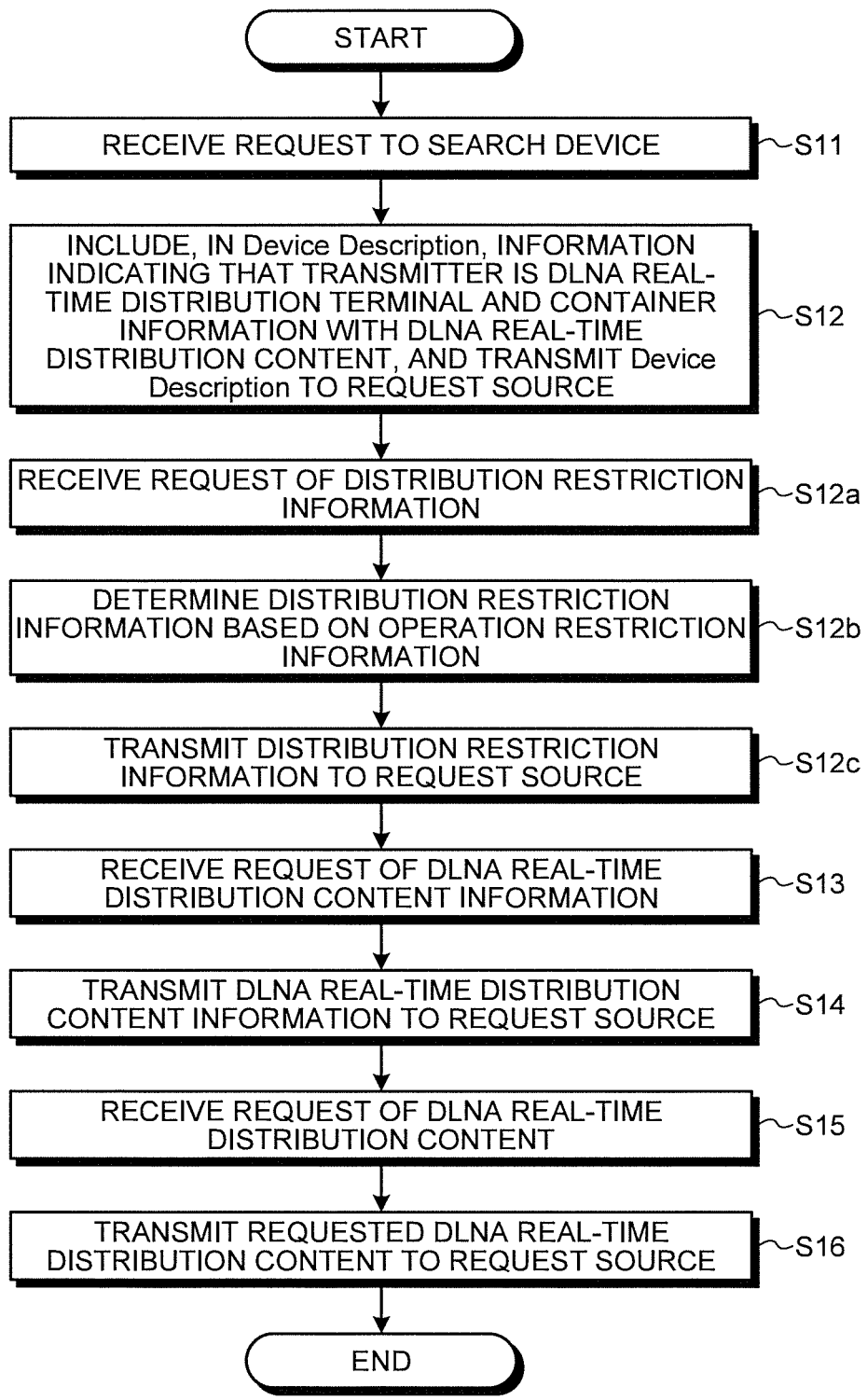
FIG. 14 is an exemplary flowchart of operation of the content transmitter in the third modification.

FIG. 14 is a flowchart illustrating an example of the operation of the content transmitter 1b according to the third modification. As illustrated in FIG. 14, upon receiving the request for the distribution restriction information from the content receiver 2b (S12a), the distribution restriction information determination module 1102 of the content transmitter 1b determines the distribution restriction information based on the operation restriction information notified from the terminal operation manager 1103 (S12b). Then, the distribution restriction information determination module 1102 causes the distribution restriction information transmitting and receiving module 1101 to transmit the determined distribution restriction information to the content receiver 2b, which is the request source (S12c).

Figure 15:
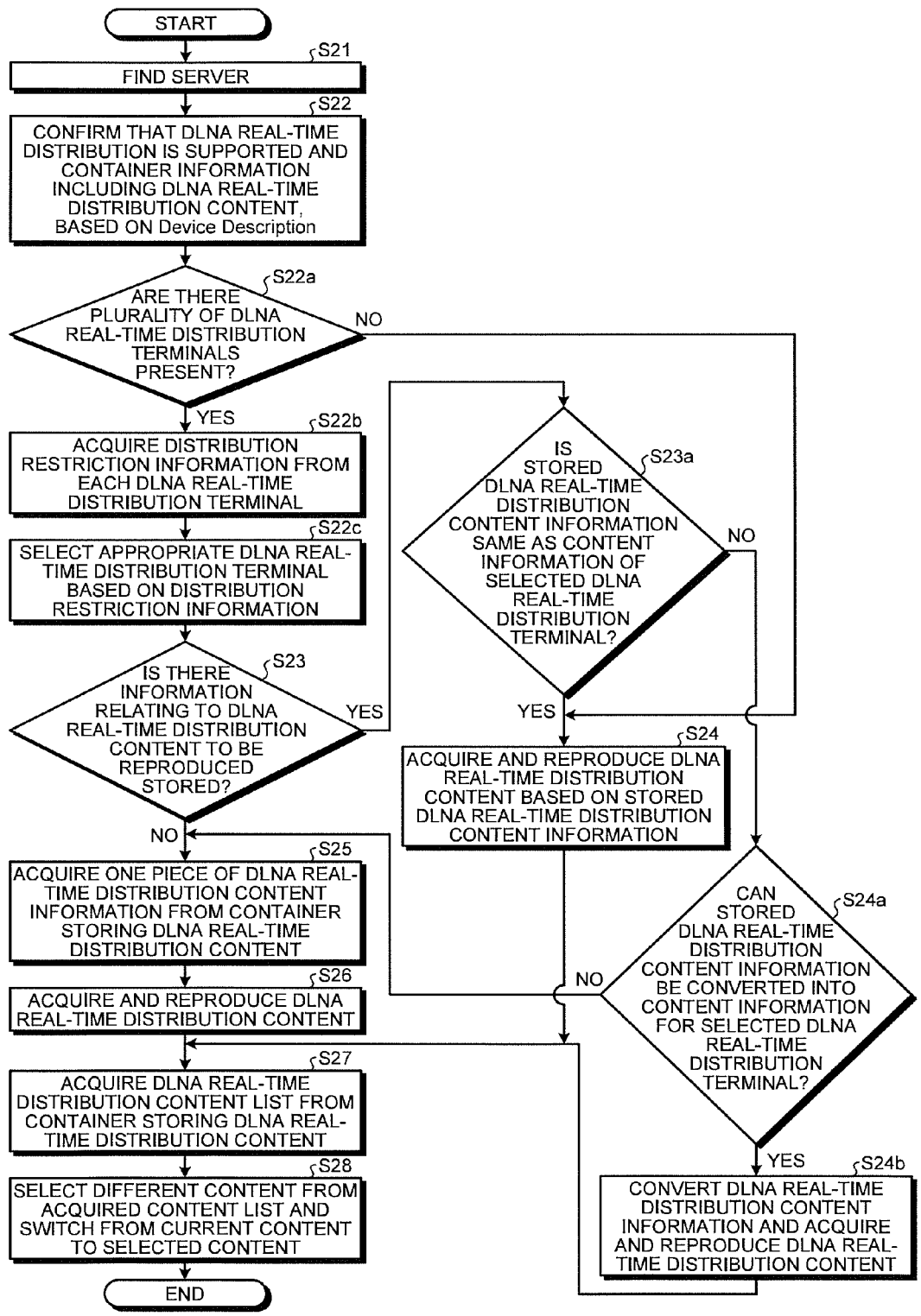
FIG. 15 is an exemplary flowchart of operation of the content receiver in the third modification.

FIG. 15 is a flowchart illustrating an example of the operation of the content receiver 2b according to the third modification. As illustrated in FIG. 15, after S22, the transmitter determination module 2102 of the content receiver 2b determines whether a plurality of content transmitters 1b are present as the DLNA real-time distribution terminals based on the acquired device information (S22a). If only the content transmitter 1b serving as the DLNA real-time distribution terminal is present (No at S22a), the procedure proceeds to S24.

If the content transmitters 1b serving as the DLNA real-time distribution terminals are present (Yes at S22a), the device information manager 2002 notifies the transmitter determination module 2102 of a request to determine a transmitter. The transmitter determination module 2102 acquires the distribution restriction information of each of the content transmitters 1b serving as the DLNA real-time distribution terminals in response to the determination request notified from the device information manager 2002 (S22b). Then, the transmitter determination module 2102 selects (determines) the content transmitter 1b suitable for acquiring on-air content, i.e., the content transmitter 1b that can distribute on-air content now and in the future, based on the distribution restriction information acquired from each content transmitter 1b (S22c). The procedure, then, proceeds to S23.

In the third modification, if the content information relating to the DLNA real-time distribution content has been acquired and stored in the content information storage module 2006 (No at S23), the content information manager 2005 determines whether the content information relating to the stored DLNA real-time distribution content is the same as that of the selected DLNA real-time distribution terminal (S23a). Specifically, the content information manager 2005 compares device identifier (a unique device name (UDN)) included in the already stored content information with that of the selected DLNA real-time distribution terminal for the determination.

If they are the same content information (Yes at S23a), the procedure proceeds to S24 because the selected DLNA real-time distribution terminal and the DLNA real-time distribution terminal that has received distribution and reproduced distributed content have the same content storage structure, and thus, content can be designated by the same URI (content URI). If they are not the same content information (No at S23a), the content storage structures differ from each other, and thus, content cannot be designated by the URI (content URI) of the content information stored in the content information storage module 2006. Accordingly, if they are not the same content information, the content information manager 2005 determines whether the content information stored in the content information storage module 2006 can be converted into the content information of the selected DLNA real-time distribution terminal (S24a). Specifically, the content information manager 2005 compares information, such as a vendor name and a model name, included in the device information of the selected DLNA real-time distribution terminal with information, such as the vendor name and the model name, included in the device information of the DLNA real-time distribution terminal that has received distribution and reproduced the distributed content so as to determine whether they are supplied from the same vendor, for example. If they are supplied from the same vendor, the content information can be converted in accordance with the rules specified by the vendor. If the content information can be converted, the content information manager 2005 converts the content information stored in the content information storage module 2006, and the content reproduction controller 2008 acquires and reproduces the DLNA real-time distribution content based on the converted content information (S24b).

The programs executed in the embodiment are provided by being preliminarily stored in the ROM, for example. The programs executed in the embodiment may be recorded into a storage medium readable by a computer with a format installable in or a file executable by the computer, and provided. The examples of the storage medium comprise a compact disk ROM (CD-ROM), a flexible disk (FD), a CD-recordable (CD-R), and a digital versatile disk (DVD).

The programs executed in the embodiment may be stored in a computer connected to a network such as the Internet, and be provided by being downloaded through the network. The programs executed in the embodiment may be provided or delivered through a network such as the Internet.

The programs executed in the embodiment have a module structure comprising the above-described functional structures. In actual hardware, the CPU (processor) reads the programs from the ROM and executes the programs. Once the programs are executed, the above-described functional structures are load into a main storage, so that the functional structures are formed in the main storage.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a receiver configured to receive a first on-air content; and
   a communication module communicatively coupled to the receiver, wherein the communication module is configured to
   (i) transmit, to a second electronic device, device information and identification information, the device information identifying whether the electronic device is capable of transmitting on-air content via streaming, the identification information identifying a storage location of the first on-air content,
   (ii) receive, from the second electronic device, a request to transmit a content information, the content information used to acquire the first on-air content from the storage location,
   (iii) transmit, to the second electronic device, the content information,
   (iv) receive, from the second electronic device, a request to transmit the first on-air content, the first on-air content designated by the request to transmit the first on-air content, and
   (v) transmit, to the second electronic device, the first on-air content via streaming.

2. The electronic device of claim 1, wherein the receiver comprises a tuner.

3. The electronic device of claim 1, wherein:
   the electronic device is a digital media server, and
   the content information includes an electronic program guide (EPG) information.

4. An electronic device comprising:
   an acquisition module, wherein the acquisition module is configured to
   (i) receive, from another electronic device, device information and identification information, the device information being for identifying that the another electronic device is a device that can transmit an on-air content via streaming, the identification information being for identifying a storage location of an on-air content,
   (ii) request the another electronic device for an on-air content, the another electronic device being indicated by the received device information as a device that can transmit an on-air content via streaming, and
   (iii) receive content information that is being used for acquiring an on-air content from the storage location identified by the identification information according to the request;
   a receiver module configured to receive, from the another electronic device, a first on air content via streaming, the first on-air content being designated based on the content information; and
   a reproduction module configured to reproduce the received first on-air content.

5. The electronic device of claim 4, further comprising a storage module configured to store content information that is preliminarily received from the another electronic device, wherein
   the receiver is configured to receive an on-air content via streaming, the on-air content being designated based on the content information stored in the storage module.

6. The electronic device of claim 4, further comprising a display configured to display an on-air content received from the another electronic device.

7. A transmitting method of an electronic device, comprising:
   receiving an on-air content;
   transmitting, to another electronic device, device information and identification information, the device information being for identifying that the electronic device is a device that can transmit an on-air content via streaming, the identification information being for identifying a storage location of an on-air content;
   receiving, from the another electronic device, a request to transmit an on-air content;
   transmitting content information that is being used for acquiring a designated on-air content from the storage location identified by the identification information by the another electronic device according to the request; and
   transmitting, to the another electronic device, a first on-air content via streaming, the first on-air content being designated based on the content information by the another electronic device.

8. The transmitting method of claim 7, wherein an on-air content is received by a tuner provided to the electronic device.

9. A receiving method of an electronic device, comprising:
   receiving, from another electronic device, device information and identification information, the device information being for identifying that the another electronic device is a device that can transmit an on-air content via streaming, the identification information being for identifying a storage location of an on-air content;
   requesting the another electronic device for an on-air content, the another electronic device being indicated by the received device information as a device that can transmit an on-air content via streaming;
   receiving content information that is being used for acquiring an on-air content from the storage location identified by the identification information according to the request;
   receiving, from the another electronic device, a first on-air content via streaming, the first on-air content being designated based on the content information; and
   reproducing the received first on-air content.

10. The receiving method of claim 9, further comprising receiving an on-air content via streaming, the on-air content being designated based on content information stored in a storage module, the content information stored in the storage module being preliminarily received from the another electronic device.

11. The receiving method of claim 9, further comprising displaying an on-air content received from the another electronic device.

\* \* \* \* \*